(12) United States Patent
Malik

(10) Patent No.: US 8,437,884 B2
(45) Date of Patent: May 7, 2013

(54) SYSTEM AND METHOD FOR DETECTING VEHICLE MOTION

(75) Inventor: Matthew R. Malik, Highland, MI (US)

(73) Assignee: GM Global Technology Operations LLC

( * ) Notice: Subject to any disclaimer, the term of this patent is extended or adjusted under 35 U.S.C. 154(b) by 238 days.

(21) Appl. No.: 12/845,244

(22) Filed: Jul. 28, 2010

(65) Prior Publication Data
US 2012/0029727 A1 Feb. 2, 2012

(51) Int. Cl.
*G06F 17/00* (2006.01)
(52) U.S. Cl.
USPC ...... 701/1; 701/51; 701/54; 701/69; 340/971; 348/117; 348/140; 348/169
(58) Field of Classification Search ............... 701/1, 51, 701/54, 69; 273/336, 343, 348.4, 378.3, 273/400, 401, 402, 570; 348/117, 140, 169; 248/205.3; 473/588, 594; 123/350; 477/110; 340/971; 104/243; 40/593
See application file for complete search history.

(56) References Cited

U.S. PATENT DOCUMENTS

| | | | | |
|---|---|---|---|---|
| 4,953,091 A * | 8/1990 | Baltusis et al. | | 701/67 |
| 5,133,229 A * | 7/1992 | Asada et al. | | 477/129 |
| 5,475,590 A * | 12/1995 | Palansky et al. | | 701/67 |
| 5,521,818 A * | 5/1996 | Palansky et al. | | 701/62 |
| 5,568,386 A * | 10/1996 | Sugiura et al. | | 701/51 |
| 6,077,188 A * | 6/2000 | Futamura et al. | | 477/65 |
| 7,099,762 B2 * | 8/2006 | Graf et al. | | 701/54 |
| 7,569,948 B2 * | 8/2009 | Davis et al. | | 307/10.1 |
| 7,881,846 B2 * | 2/2011 | Reinke et al. | | 701/54 |
| 7,908,066 B2 * | 3/2011 | Graf et al. | | 701/54 |
| 2010/0313849 A1 * | 12/2010 | Stoner et al. | | 123/350 |
| 2011/0313629 A1 * | 12/2011 | Louie et al. | | 701/55 |

* cited by examiner

*Primary Examiner* — McDieunel Marc

(57) ABSTRACT

A control system for a vehicle includes a period determination module and a motion detection module. The period determination module determines a period for the vehicle to travel a predetermined distance based on a desired transmission output shaft speed (TOSS), a target transmission output shaft position, a final drive ratio of the vehicle, and a tire size of the vehicle. The motion detection module detects whether the vehicle is moving based on the TOSS during the determined period.

20 Claims, 3 Drawing Sheets

SYSTEM AND METHOD FOR DETECTING VEHICLE MOTION

FIELD

The present disclosure relates to vehicle control systems and more particularly to a system and method for detecting motion of a vehicle.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Internal combustion engines combust an air/fuel (A/F) mixture within cylinders to drive pistons that rotatably turn a crankshaft generating drive torque. The drive torque may be transferred from the crankshaft to a driveline (e.g., wheels) of a vehicle via a transmission. A transmission output shaft speed (TOSS) sensor may measure a rotational speed (e.g., in revolutions per minute, or RPM) of an output shaft of the transmission. The TOSS may be used to determine a speed of the vehicle.

SUMMARY

A control system for a vehicle includes a period determination module and a motion detection module. The period determination module determines a period for the vehicle to travel a predetermined distance based on a desired transmission output shaft speed (TOSS), a target transmission output shaft position, a final drive ratio of the vehicle, and a tire size of the vehicle. The motion detection module detects whether the vehicle is moving based on the TOSS during the determined period.

A method for a vehicle includes determining a period for the vehicle to travel a predetermined distance based on a desired transmission output shaft speed (TOSS), a target transmission output shaft position, a final drive ratio of the vehicle, and a tire size of the vehicle, and detecting whether the vehicle is moving based on the TOSS during the determined period.

In still other features, the systems and methods described above are implemented by a computer program executed by one or more processors. The computer program can reside on a tangible computer readable medium such as but not limited to memory, nonvolatile data storage, and/or other suitable tangible storage mediums.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
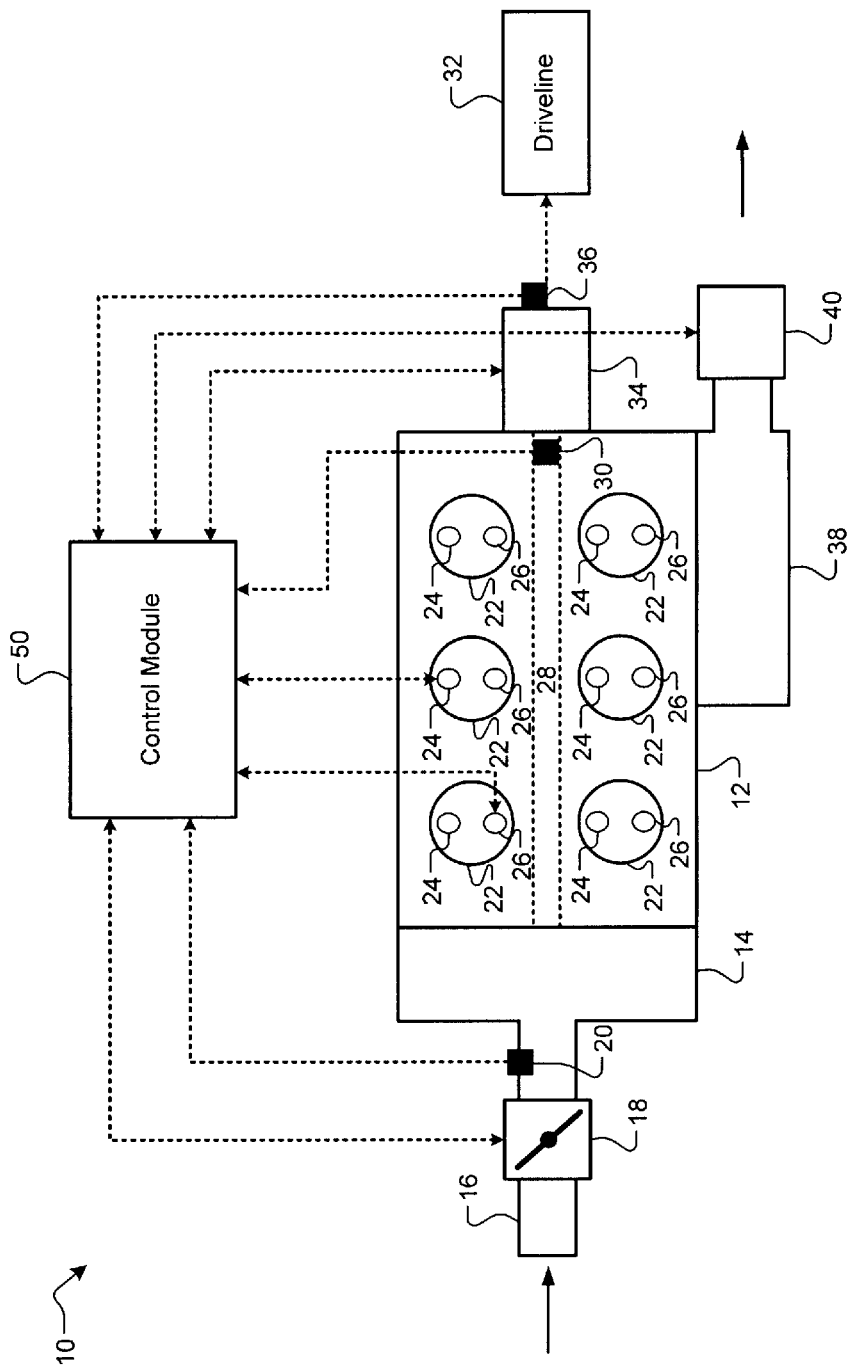
FIG. 1 is a functional block diagram of an exemplary vehicle according to the present disclosure.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

Conventional systems detect vehicle motion based on vehicle speed or vehicle acceleration. Specifically, conventional systems may detect vehicle motion when the vehicle speed or vehicle acceleration is greater than a predetermined threshold. Detecting vehicle motion based on vehicle speed or vehicle acceleration, however, may be inaccurate. More specifically, vehicle speed and vehicle acceleration may be more susceptible to sensor noise (e.g., the transmission output shaft speed, or TOSS sensor).

Accordingly, a system and method are presented for improved detection of vehicle motion. The system and method may detect vehicle motion based on a distance that the vehicle has traveled (i.e., distance-based detection). More specifically, the system and method may determine a period for the vehicle to travel a predetermined distance. For example, the system and method may determine the period based on a target (i.e., desired) TOSS, a final drive ratio of the vehicle, and a tire size of the vehicle (e.g., tire radius or diameter).

The system and method may then monitor TOSS sensor output during the determined period. More specifically, the system and method may detect vehicle motion when the TOSS sensor output during the period is greater than a predetermined threshold. For example, the TOSS sensor may output pulses and thus the predetermined threshold may include a predetermined number of pulses. Additionally, the system and method may filter the TOSS sensor output. For example, the system and method may discard TOSS sensor output (e.g., pulses) due to noise (e.g., less than a predetermined signal intensity threshold).

Moreover, the system and method may compare the detection of vehicle motion according to the present disclosure to results of alternative detection methods in order to mitigate fault detection. In other words, the system and method may generate an error signal (e.g., indicating unintended vehicle motion) when the detection of vehicle motion is the same as the results of the alternative detection methods. For example, the alternative detection methods may include the conventional motion detection based on vehicle speed or vehicle acceleration (previously described). Additionally or alternatively, the system and method may store the comparison for long-term monitoring.

Referring now to FIG. 1, a vehicle 10 includes an engine 12. For example, the engine 12 may include one of a spark ignition (SI) engine, a compression ignition (CI) engine (e.g., a diesel engine), and a homogeneous charge compression ignition (HCCI) engine. The vehicle 10, however, may also include other components (e.g., an electric motor, a battery system, a generator, etc.), such as in an electric vehicle or a hybrid electric vehicle.

The engine 12 draws air into an intake manifold 14 through an inlet system 16 that may be regulated by a throttle 18. For example, the throttle 18 may be electrically controlled (e.g., electronic throttle control, or ETC). A mass air flow (MAF) sensor 20 may measure a rate of airflow into the intake manifold 14. The air in the intake manifold 14 may be distributed to a plurality of cylinders 22. While six cylinders are shown, however, the engine 12 may include other numbers of cylinders.

The air may be combined with fuel from a plurality of fuel injectors 24 to create an air/fuel (A/F) mixture. For example, the fuel injectors 24 may inject the fuel into intake ports of the cylinders 22, respectively (e.g., port fuel injection), or directly into the cylinders 22, respectively (e.g., direct fuel injection). Additionally, for example, the fuel injectors 24 may inject the fuel at different times depending on the type of engine. The A/F mixture in the cylinders 22 may be compressed by pistons (not shown) and ignited by a plurality of spark plugs 26, respectively (e.g., SI engines or HCCI engines using spark assist). The air in the cylinders 22, however, may also be compressed by the pistons (not shown) and combusted by injecting the fuel into the pressurized air (e.g., CI engines, such as diesel engines).

The combustion of the A/F mixture drives the pistons (not shown) which rotatably turn a crankshaft 28 generating drive torque. An engine speed sensor 30 may measure a rotational speed of the crankshaft 28 (e.g., in revolutions per minute, or RPM). The drive torque may be transferred to a driveline 32 of the vehicle 10 by a transmission 34. In other words, the transmission 34 may multiply the drive torque at the crankshaft 28 by one of a plurality of gear ratios. For example, the transmission 34 may be coupled to the crankshaft 28 by a fluid coupling such as a torque converter.

A TOSS sensor 36 measures a rotational speed of an output shaft of the transmission 34 (e.g., in RPM). The measurement of the TOSS sensor 36 may indicate vehicle speed. For example, the TOSS sensor 36 may include a gear having plurality of teeth and that is connected to the output shaft of the transmission 34. Thus, the TOSS sensor 36 may generate a signal having a frequency corresponding to the rotational speed of the output shaft of the transmission 34. In other words, the frequency of the signal from the TOSS sensor 36 may increase as the TOSS increases. For example, the signal from the TOSS sensor may include one of a pulse-width modulated (PWM) signal, a saw-tooth signal, and a sinusoidal signal. Additionally, for example, the TOSS sensor 36 may include a unidirectional TOSS sensor or a directional TOSS sensor. Alternatively, another suitable sensor may be implemented, such as an anti-lock braking system (ABS) wheel sensor.

Exhaust gas resulting from combustion may be expelled from the cylinders 22 into an exhaust manifold 38. An exhaust treatment system 40 may treat the exhaust gas in the exhaust manifold to decrease emissions before releasing the exhaust gas into the atmosphere. For example, the exhaust treatment system 40 may include one or more of catalytic converters, nitrogen oxide (NOx) absorbers/adsorbers, selective catalytic reduction (SCR) catalysts, and particulate matter (PM) filters. The vehicle 10 may also include other systems including, but not limited to a turbocharger or a supercharger, and an exhaust gas recirculation (EGR) system. Additionally, the vehicle 10 may also include other sensors or actuators.

A control module 50 communicates with and/or controls various components of the vehicle 10. Specifically, the control module 50 may receive signals from the throttle 18, the MAF sensor 20, the fuel injectors 24, the spark plugs 26, the engine speed sensor 30, the transmission 34, the TOSS sensor 36, and/or the exhaust treatment system 40. The control module 50 may control the throttle (e.g., ETC), the fuel injectors 24, the spark plugs 26, the transmission 34, and/or the exhaust treatment system 40. The control module 50 may also implement the system or method of the present disclosure.

Figure 2:
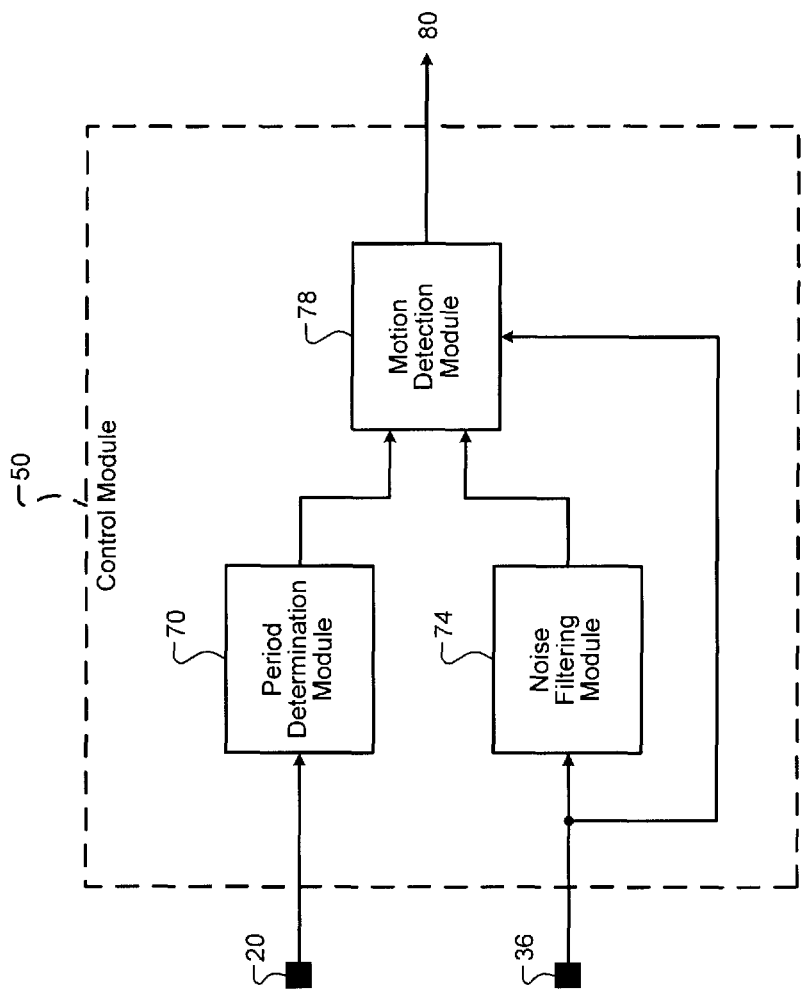
FIG. 2 is a functional block diagram of an exemplary control module according to the present disclosure.

Referring now to FIG. 2, the control module 50 is shown in more detail. The control module 50 may include a period determination module 70, a noise filtering module 74, and a motion detection module 78. The control module 50 may also include memory (not shown) for storing determined and/or predetermined parameters. For example, the memory (not shown) may include non-volatile memory (NVM).

The period determination module 70 receives a signal 72 indicating a target transmission output shaft position has been detected by the TOSS sensor 36. For example, the target transmission output shaft position may include a target gear tooth of the TOSS sensor 36. Additionally, for example only, a desired TOSS may be based on operating parameters such as engine speed and/or MAF (e.g., from the engine speed sensor 30 and MAF sensor 20, respectively). The desired TOSS, however, may be determined using other suitable methods.

The period determination module 70 may also retrieve (e.g., from the memory) a final drive ratio of the vehicle and a tire size of the vehicle. For example, the final drive ratio may represent a ratio of one rotation of the transmission output shaft to one rotation of the vehicle wheels. In other words, the final drive ratio may be a predetermined ratio and the tire size may be a predetermined (i.e., default radius or diameter) size. The final drive ratio and/or the tire size, however, may also be measured or input (e.g., upon tire replacement).

The period determination module 70 may determine a period for the vehicle to travel a predetermined distance based on the desired TOSS, the target transmission output shaft position, the final drive ratio, and the tire size. In other words, the period determination module 70 may determine, based on the desired TOSS, how long the vehicle would take to roll the predetermined distance. For example, the period may be determined as follows:

$$t_d = \frac{d_p}{2\pi \times r_{tire} \times \frac{TOSS_{des}}{dr_{final}}}, \qquad (1)$$

where $t_d$ is the determined period, $d_p$ is the predetermined distance, $r_{tire}$ is the radius of the tires, $TOSS_{des}$ is the desired TOSS, and $dr_{final}$ is the final drive ratio.

The noise filtering module 74 receives a signal from the TOSS sensor 36 (a "TOSS signal") indicating vehicle speed. For example, the TOSS signal may include a plurality of pulses having a frequency corresponding to vehicle speed. The noise filtering module 74 may filter the TOSS signal to remove noise. More specifically, the noise filtering module 74 may discard pulses from the TOSS signal having intensities less than a predetermined signal intensity threshold. The noise filtering module 74 may then output a filtered TOSS signal (i.e., without the discarded pulses) to the motion detection module 78.

The motion detection module 78 receives the determined period and the filtered TOSS signal from the period determination module 70 and the signal filtering module 74, respectively. The motion detection module 78 may detect vehicle motion based on the filtered TOSS signal during the determined period. More specifically, the motion detection module 78 may determine a number of pulses in the filtered TOSS signal during the determined period. The motion detection module 78 may then detect vehicle motion when the determined number of pulses is greater than a predetermined number of pulses.

The motion detection module 78 may also detect vehicle motion according to alternative detection methods. For example, the alternative detection methods may include detecting vehicle motion when vehicle speed and/or vehicle acceleration are greater than predetermined thresholds, respectively (i.e., the conventional detection methods). The vehicle speed and vehicle acceleration may be determined using the TOSS signal (from TOSS sensor 36).

The motion detection module 78 may also compare the detection of vehicle motion according to the present disclosure with the results of the alternative detection method(s). When the vehicle motion is detected by both the system or method of the present disclosure and the alternative method(s), the motion detection module 78 may output an error signal (e.g., indicating unintended vehicle motion). Additionally, results of the comparison(s) may be stored (e.g., in the memory) for long-term monitoring (e.g., during a predetermined period).

Figure 3:
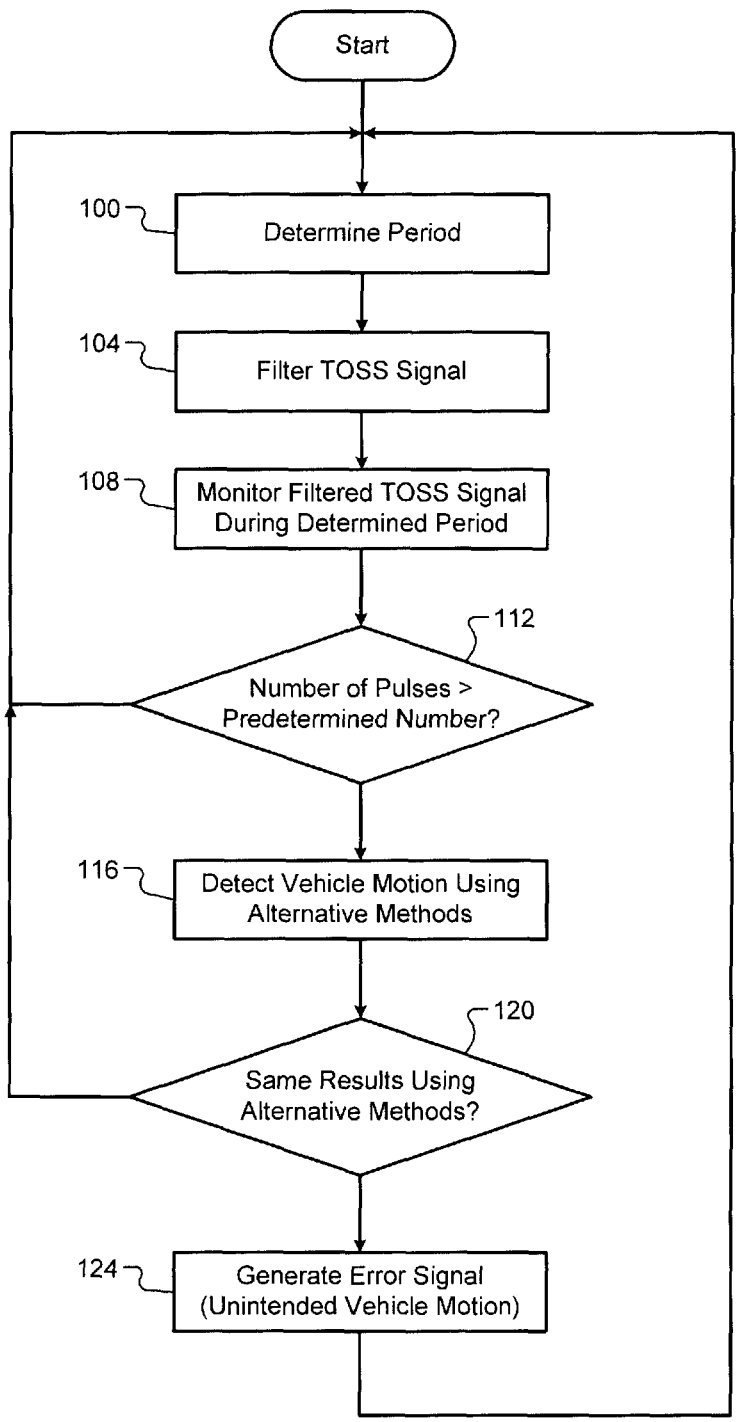
FIG. 3 is a flow diagram of an exemplary method for detecting motion of a vehicle according to the present disclosure.

Referring now to FIG. 3, a method for detecting vehicle motion begins at 100. At 100, the control module 50 may determine the period for the vehicle to travel the predetermined distance. At 104, the control module 50 may filter the TOSS signal (e.g., remove pulses due to noise). At 108, the control module 50 may monitor the filtered TOSS signal during the determined period. At 112, the control module 50 may determine whether a number of pulses in the TOSS signal during the determined period are greater than a predetermined number of pulses. If true, control may proceed to 116. If false, control may return to 100.

At 116, the control module 50 may detect vehicle motion according to the alternative method(s) (i.e., based on vehicle speed and/or vehicle acceleration). At 120, the control module 50 may compare the detection of vehicle motion according to the method of the present disclosure to the results of the alternative method(s). If the results are the same, control may proceed to 124. If the results are different, control may return to 100. At 124, the control module 50 may generate an error signal (e.g., indicating unintended vehicle motion). Control may then return to 100.

The broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A control system for a vehicle, comprising:
    a period determination module that determines a period for the vehicle to travel a predetermined distance based on a desired transmission output shaft speed (TOSS), a target transmission output shaft position, a final drive ratio of the vehicle, and a tire size of the vehicle; and
    a motion detection module that detects whether the vehicle is moving based on the TOSS during the determined period.

2. The control system of claim 1, further comprising:
    a TOSS sensor that generates a TOSS signal having a plurality of pulses and a frequency based on the TOSS.

3. The control system of claim 2, wherein the TOSS sensor includes a gear having a plurality of teeth, and wherein the target transmission output shaft position includes one of the plurality of teeth.

4. The control system of claim 2, further comprising:
    a noise filtering module that filters the TOSS signal to remove pulses having intensities less than a predetermined signal intensity threshold.

5. The control system of claim 4, wherein the motion detection module detects whether the vehicle is moving based on the filtered TOSS signal during the determined period.

6. The control system of claim 5, wherein the motion detection module detects that the vehicle is moving when the filtered TOSS signal includes a number of pulses during the determined period greater than a predetermined number of pulses.

7. The control system of claim 6, wherein the motion detection module also detects whether the vehicle is moving based on at least one of vehicle speed and vehicle acceleration.

8. The control system of claim 7, wherein the motion detection module compares the detection of whether the vehicle is moving based on the filtered TOSS signal during the period to the detection of whether the vehicle is moving based on the at least one of vehicle speed and vehicle acceleration.

9. The control system of claim 8, wherein the motion detection module generates an error signal indicating unintended vehicle motion when the detection of whether the vehicle is moving based on the filtered TOSS signal during the period is the same as the detection of whether the vehicle is moving based on the at least one of vehicle speed and vehicle acceleration.

10. The control system of claim 8, wherein the comparison is stored in memory for monitoring during a predetermined period.

11. A method for a vehicle, comprising:
    determining, using a processor, a period for the vehicle to travel a predetermined distance based on a desired transmission output shaft speed (TOSS), a target transmission output shaft position, a final drive ratio of the vehicle, and a tire size of the vehicle; and
    detecting, using the processor, whether the vehicle is moving based on the TOSS during the determined period.

12. The method of claim 11, further comprising generating, using the processor, a TOSS signal having a plurality of pulses and a frequency based on the TOSS using a TOSS sensor.

13. The method of claim 12, wherein the TOSS sensor includes a gear having a plurality of teeth, and wherein the target transmission output shaft position includes one of the plurality of teeth.

14. The method of claim 12, further comprising filtering, using the processor, the TOSS signal to remove pulses having intensities less than a predetermined signal intensity threshold.

15. The method of claim 14, further comprising detecting, using the processor, whether the vehicle is moving based on the filtered TOSS signal during the determined period.

16. The method of claim 15, further comprising detecting, using the processor, that the vehicle is moving when the filtered TOSS signal includes a number of pulses during the determined period greater than a predetermined number of pulses.

17. The method of claim 16, further comprising detecting, using the processor, whether the vehicle is moving based on at least one of vehicle speed and vehicle acceleration.

18. The method of claim 17, further comprising comparing, using the processor, the detection of whether the vehicle is moving based on the filtered TOSS signal during the period to the detection of whether the vehicle is moving based on the at least one of vehicle speed and vehicle acceleration.

19. The method of claim 18, further comprising generating, using the processor, an error signal indicating unintended vehicle motion when the detection of whether the vehicle is moving based on the filtered TOSS signal during the period is the same as the detection of whether the vehicle is moving based on the at least one of vehicle speed and vehicle acceleration.

20. The method of claim 18, wherein the comparison is stored in memory for monitoring during a predetermined period.

\* \* \* \* \*